(12) United States Patent  (10) Patent No.: US 7,958,813 B1
Serkland et al.  (45) Date of Patent: Jun. 14, 2011

(54) AIRCRAFT ORDINANCE MOUNTING SYSTEM

(75) Inventors: Mark D. Serkland, Lavon, TX (US); James A. Hardin, McKinney, TX (US); Steven S. Cone, Muenster, TX (US)

(73) Assignee: Contract Fabrication and Design, LLC, Princeton, TX (US)

( * ) Notice: Subject to any disclaimer, the term of this patent is extended or adjusted under 35 U.S.C. 154(b) by 143 days.

(21) Appl. No.: 12/434,987

(22) Filed: May 4, 2009

Related U.S. Application Data

(60) Provisional application No. 61/053,058, filed on May 14, 2008.

(51) Int. Cl.
*B64D 7/00* (2006.01)

(52) U.S. Cl. .................... 89/37.22; 89/37.16; 244/118.1

(58) Field of Classification Search ................. 89/37.16, 89/37.17, 37.21, 37.22, 37.19; 244/118.1, 244/137.1
See application file for complete search history.

(56) References Cited

U.S. PATENT DOCUMENTS

| | | | |
|---|---|---|---|
| 4,893,545 A | 1/1990 | Sanderson et al. | |
| 5,187,318 A * | 2/1993 | Sanderson et al. | 89/37.22 |
| 5,191,370 A * | 3/1993 | Bozzolato | 396/13 |
| 5,253,574 A * | 10/1993 | Sanderson | 89/34 |
| 5,263,397 A * | 11/1993 | Sanderson | 89/37.22 |
| 5,390,582 A * | 2/1995 | Sanderson | 89/37.22 |
| 5,417,141 A * | 5/1995 | Sanderson | 89/37.22 |
| 5,419,234 A * | 5/1995 | Sanderson | 89/37.22 |
| 5,421,239 A * | 6/1995 | Sanderson | 89/37.22 |
| 5,517,895 A * | 5/1996 | Sanderson | 89/37.16 |
| 5,767,436 A * | 6/1998 | Sanderson et al. | 89/37.22 |
| 6,241,185 B1 * | 6/2001 | Sanderson | 244/118.1 |
| 6,250,196 B1 * | 6/2001 | Sanderson | 89/37.16 |
| 6,286,411 B1 * | 9/2001 | Sanderson | 89/37.16 |
| 6,293,016 B1 * | 9/2001 | Sanderson | 29/897.1 |
| 6,293,179 B1 * | 9/2001 | Sanderson | 89/37.03 |
| 6,564,690 B1 * | 5/2003 | Long | 89/37.16 |
| 6,820,532 B2 * | 11/2004 | Sanderson | 89/41.18 |
| 7,481,147 B1 * | 1/2009 | Serkland et al. | 89/37.22 |
| 7,765,912 B1 * | 8/2010 | Serkland | 89/37.21 |

* cited by examiner

*Primary Examiner* — Benjamin P Lee
(74) *Attorney, Agent, or Firm* — Haynes and Boone, LLP

(57) ABSTRACT

An ordnance mounting system for a helicopter operatively supports a weaponry support beam above an upwardly projecting floor obstruction in a cabin area of the helicopter, between opposite cabin door openings, with the support beam longitudinally extending transversely through the cabin area, and outer weaponry mounting end portions of the support beam projecting outwardly through the door openings beyond opposite fuselage side walls of the helicopter. The mounting system may be secured to door opening sill structures, or the cabin ceiling or side walls, and permits vertical bending flexure of the installed support beam due to flight and weaponry weight loads on the outer ends of the support beam.

17 Claims, 5 Drawing Sheets

AIRCRAFT ORDINANCE MOUNTING SYSTEM

CROSS-REFERENCE TO RELATED APPLICATION

This application claims the filing benefit of U.S. Provisional Patent Application Ser. No. 61/053,058 filed on May 14, 2008, such provisional application being incorporated herein by reference in its entirety.

BACKGROUND OF THE INVENTION

The present invention generally relates to aircraft armament apparatus and, in representatively illustrated embodiments thereof, more particularly relates to ordnance mounting systems utilized for mounting weaponry, such as machine guns and rocket launchers, on helicopters and other types of aircraft.

Ordnance mounting systems have previously been utilized for mounting weaponry, such as machine guns, rocket launchers and the like, on helicopters and other types of aircraft. The aircraft armament apparatus shown in U.S. Pat. No. 4,893,545 to Sanderson et al, which is hereby incorporated herein by reference, illustrates and describes a plank-shaped support beam structure formed from a honeycombed metal material and longitudinally extended transversely through the cabin area of a helicopter. The support beam has a central longitudinal section secured to the cabin area floor in close adjacency thereto, and outer ends that project outwardly through the cabin area door openings beyond opposite sides of the helicopter fuselage. These outer support beam end portions are provided with suitable weaponry support structures which may be removably and supportingly secured to machine guns, rocket launchers or other types of weaponry to hold the weaponry outwardly of the opposite helicopter or other type of aircraft sides.

While this previously utilized aircraft ordnance mounting system has proven to be well suited for its intended application, it has heretofore not been useable in helicopters (or other types of aircraft) in which various types of obstructions, such as fuel cells, project upwardly from the aircraft cabin floor and preclude attachment of the support beam center section to and in close adjacency with the cabin floor area occupied by such obstructions. It would be desirable to provide a support beam-based aircraft ordnance mounting system of the type generally described above which could be utilized in these helicopters or other types of aircraft in which securement of the support beam center section to the aircraft is hindered by obstructions, such as fuel cells, projecting upwardly from the cabin area floor. It is to this goal that the present invention is primarily directed.

SUMMARY OF THE INVENTION

In carrying out principles of the present invention, in accordance with representatively illustrated embodiments thereof, aircraft armament apparatus is provided for an aircraft, representatively a helicopter. The aircraft has a cabin area with a floor are positioned between a pair of opposite, generally vertical outer aircraft body side wall portions having door openings extending therethrough, and an obstruction, representatively a fuel cell, extending upwardly from the floor area between the door openings.

The armament apparatus comprises an elongated weaponry support beam member having a central longitudinal section disposed between first and second end portions, the central longitudinal section being disposed above the obstruction, and said first and second end portions extending outwardly through said door openings. First support apparatus is interconnected between the first support beam end portion and the aircraft, the first support apparatus permitting pivotal movement of the support beam at and relative to the first support apparatus about a first axis parallel to the length of the aircraft, and precluding longitudinal translational movement of the beam member relative to the aircraft. The armament further comprises second support apparatus which is interconnected between the second end support beam end portion and the aircraft, the second support apparatus permitting pivotal movement of the support beam at and relative to the second support apparatus about a second axis parallel to the length of the aircraft, the second support apparatus further being pivotable relative to the aircraft about a third axis parallel to the length of said aircraft.

The use of this specially designed beam mounting system advantageously avoids the necessity of moving, eliminating of modifying the cabin area floor obstruction, and also permits bending flexure of the installed beam member due to flight loads thereon.

As a part of the first support apparatus the armament apparatus may further comprise a motion limiting portion connected to the obstruction and functioning to preclude longitudinal translational movement of the support beam relative to the aircraft.

In various illustrative embodiments of the armament apparatus the first support apparatus and the second support apparatus may be utilized to secure the beam member to sill structure portions of the door openings, the cabin floor area, a ceiling area of the cabin, or interior side wall portions of the cabin.

DETAILED DESCRIPTION

Figure 1:
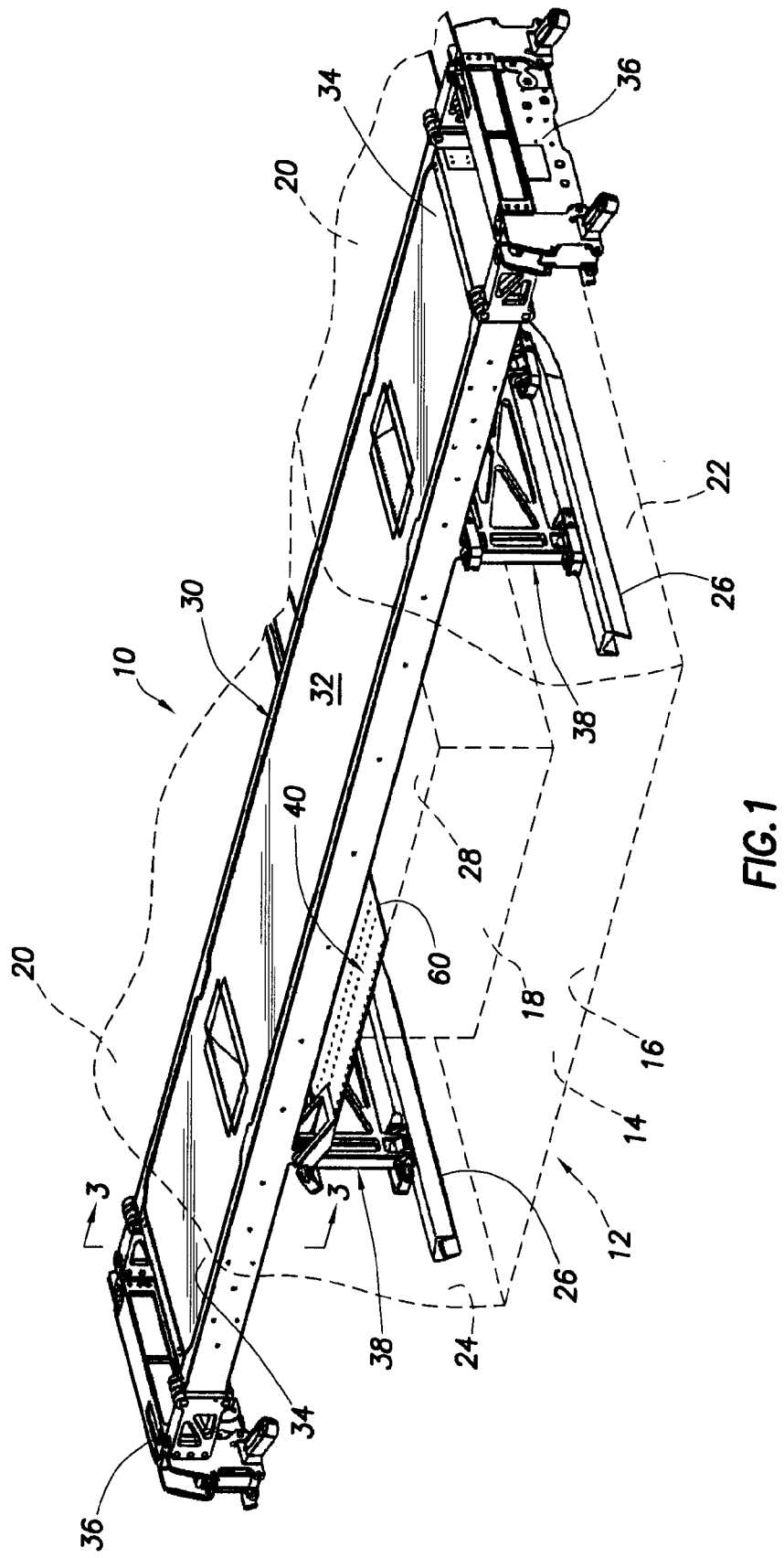
FIG. 1 is a top side perspective view of an ordnance mounting system embodying principles of the present invention and operatively installed on an aircraft, representatively a helicopter.
Figure 2:
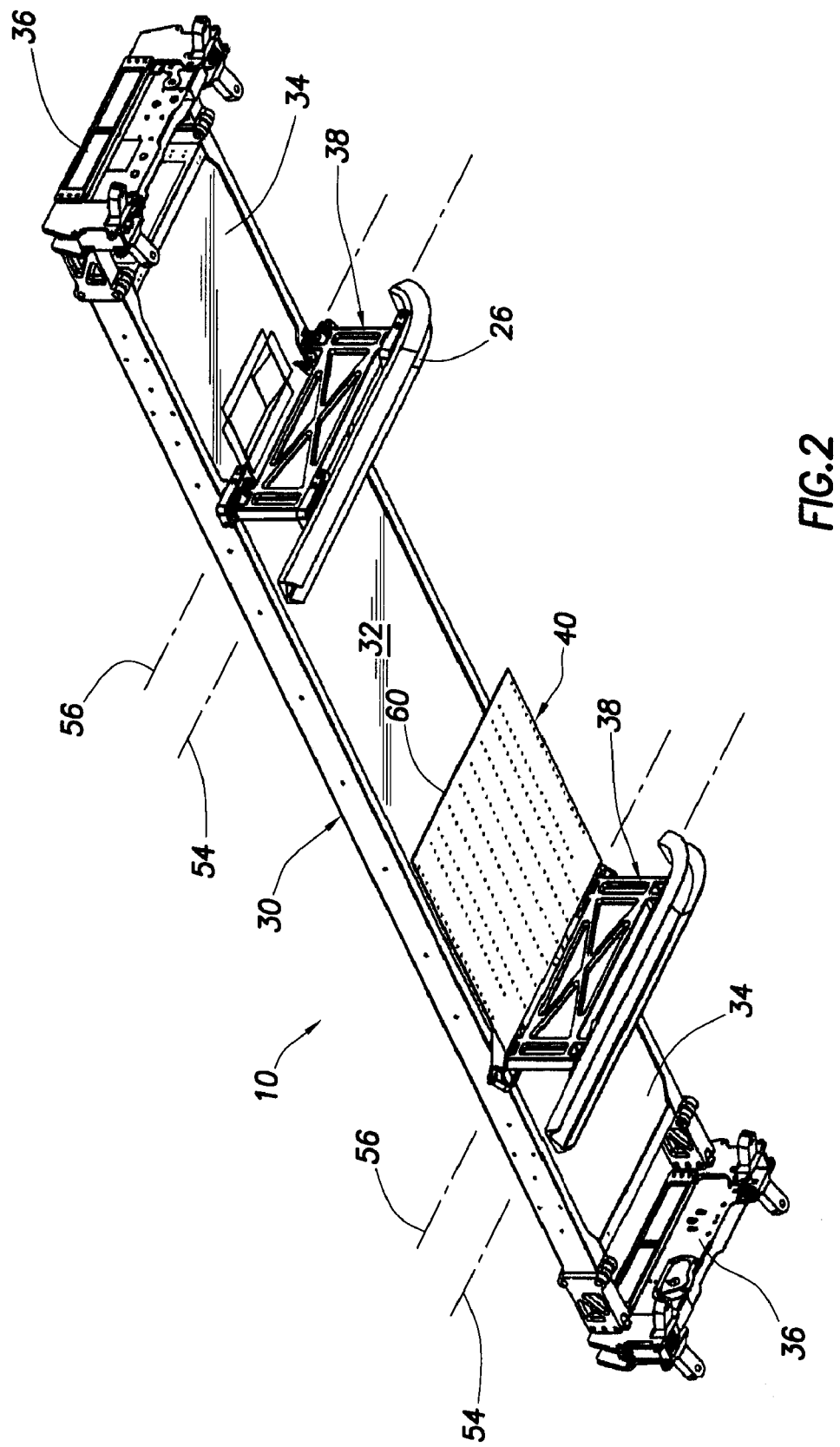
FIG. 2 is a bottom side perspective view of the ordnance mounting system.

With initial reference to FIG. 1, the present invention, in a representatively illustrated embodiment thereof, provides a specially designed ordnance mounting system (OMS) 10 for use in conjunction with a helicopter 12 or other type of aircraft having a cabin area 14 with a floor 16 from which an obstructing object, such as the schematically depicted fuel cell 18, shown in phantom, upwardly projects between the opposite cabin door openings 20 extending through opposite side portions 22,24 of the helicopter fuselage. As indicated in FIG. 1, metal sill structures 26 horizontally extend along bottom sides of the door openings 20, and are disposed at locations lower than the top side 28 of the fuel cell 18.

With reference now to FIGS. 1-4, in the illustrated representative embodiment thereof the ordnance mounting system 10 of the present invention includes an elongated, generally plank-shaped support beam structure 30 which has, illustratively but not by of limitation, a configuration and honeycombed metal construction similar to the support plank 20 in the above-referenced U.S. Pat. No. 4,893,545. The support beam 30 has a longitudinally central section 32, and a pair of outer end portions 34 to which suitable weaponry support structures 36 are secured. Such weaponry support structures 36, which may be utilized to removably support weaponry such as machine guns, rocket launchers and the like, may be similar to the weaponry support structures 40 shown in the above-referenced U.S. Pat. No. 4,893,545.

The ordnance mounting system 10 is installed on the helicopter 12 or other aircraft by longitudinally extending the support beam 30 transversely through the cabin area 14, in an upwardly spaced relationship with the top side 28 of the fuel cell 18 (or other floor-disposed upwardly projecting obstruction as the case may be), in a manner such that center section 32 of the support beam 30 is disposed within the cabin area 14 and the outer end portions 34 of the support beam 30 extend outwardly through the cabin door openings 20 and project outwardly beyond the opposite fuselage sides 22 and 24. As best illustrated in FIG. 1, this positioning of the support beam 30 operatively disposes the weaponry support structures 36, and thus weaponry secured thereto, outwardly of the opposite door openings 20. In the illustrated embodiment of the ordnance mounting system 10, the support beam 30 is secured to the opposite door sill structures 26 using a specially designed beam mounting system which will now be described with continuing reference to FIGS. 1-4.

The beam mounting system, as may be best seen in FIG. 1, does not position the beam center section 32 closely adjacent the cabin area floor 16, but instead positions the beam center section 32 in an upwardly spaced relationship with the fuel cell 18 by securing the support beam 30 to the door sill structures 26 which may be suitably reinforced to accommodate this support beam mounting technique. Basically, the beam mounting system comprises first and second support apparatuses, representatively the form of a pair of horizontally elongated, generally rectangular metal strut members 38, one of which may illustratively incorporate therein a motion limiting portion which is representatively, but not by way of limitation, a shear plate member 40. As later described herein, both the beam mounting system, and its associated motion limiting portion (if utilized), may have a variety of alternate configurations and arrangements without departing from principles of the present invention.

Figure 3:
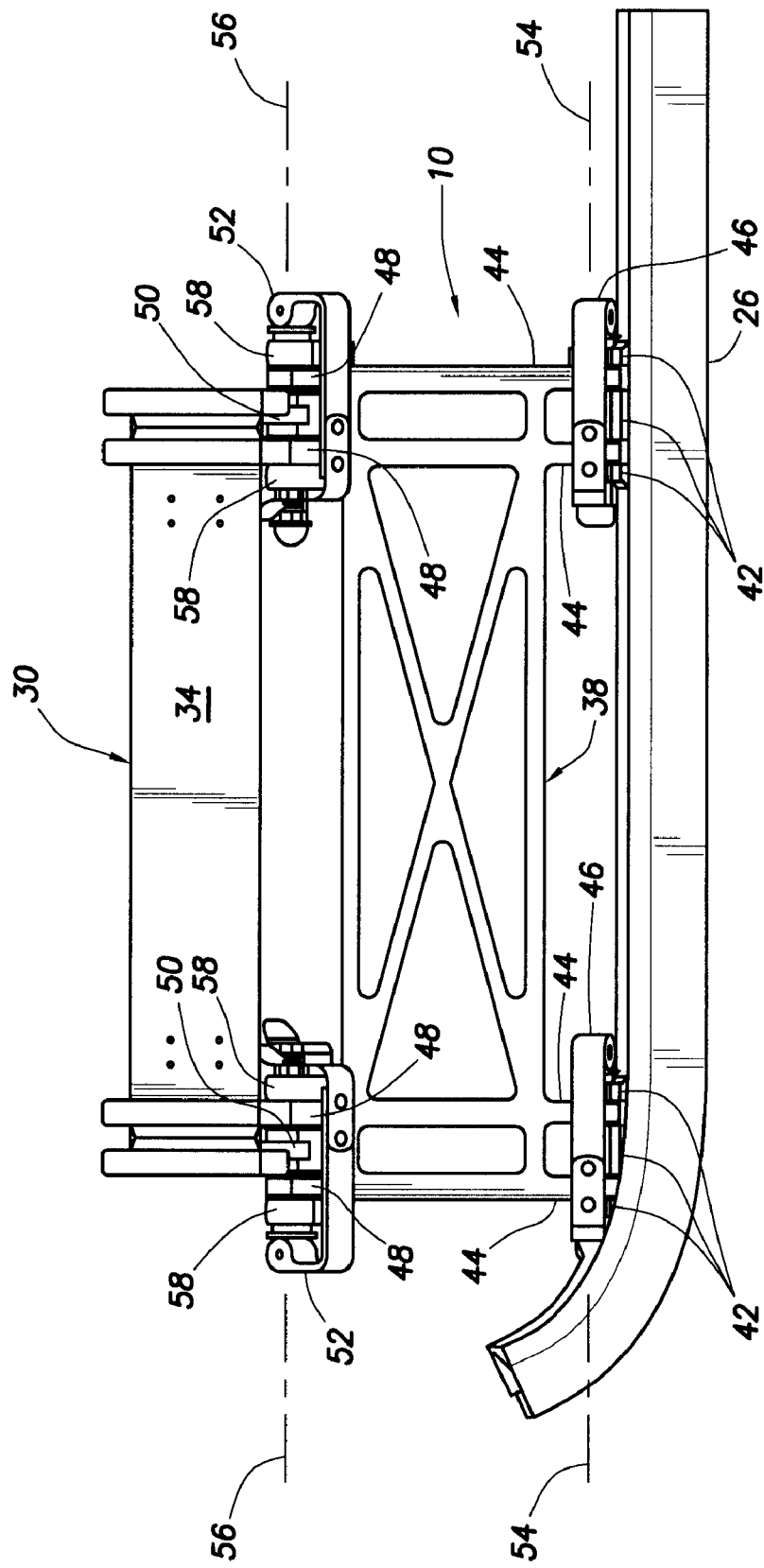
FIG. 3 is an enlarged scale cross-sectional view of the ordnance mounting system.

As best illustrated in FIG. 3, opposite end portions of bottom side edges of the strut members 38 are removably secured to top side edges of the reinforced sill structures 26 by means of upwardly projecting sill lugs 42 (representatively three in number) which are interdigitated with downwardly projecting strut member lugs 44 (representatively two in number). The interdigitated lugs 42,44 have aligned circular openings therein (not visible) through which cylindrical portions of expansion pins 46 extend. Opposite end portions of the top side edges of the strut members 38 have upwardly projecting lugs 48 (representatively two in number) which receive therebetween downwardly projecting lugs 50 on the center section 34 of the support beam 30 (see FIGS. 3 and 4). Cylindrical portions of expansion pins 52 extend through aligned openings (not visible) in the interdigitated lugs 48 and 50.

The bottom expansion pins 46 serve to interconnect the bottom side edges of the struts 38 to the sills 26 in a manner permitting the struts to pivot relative to the sills 26 about axes 54 (see FIGS. 2 and 3) transverse to the length of the support beam 30 and parallel to the length of the helicopter 12. Similarly, the upper expansion pins 52 serve to interconnect the top side edges of the struts 38 to the underside of the center section 32 of the support beam 30 in a manner permitting relative pivoting between the support beam 30 and the struts 38 about axes 56 (see FIGS. 2 and 3) transverse to the length of the support beam 30 and parallel to the length of the helicopter 12.

However, at the left end of the support beam 30 (as viewed in FIG. 1) the shear plate 40 (or other motion limiting portion of the associated support apparatus as the case may be) prevents such relative pivotal motion between the left strut 38 and its underlying sill 26, and also prevents longitudinal translational movement of the support beam 30 relative to the helicopter 12, due to an anchoring of the shear plate 40 to the left strut 38, the support beam 30, and the fuel cell 18.

Figure 4:
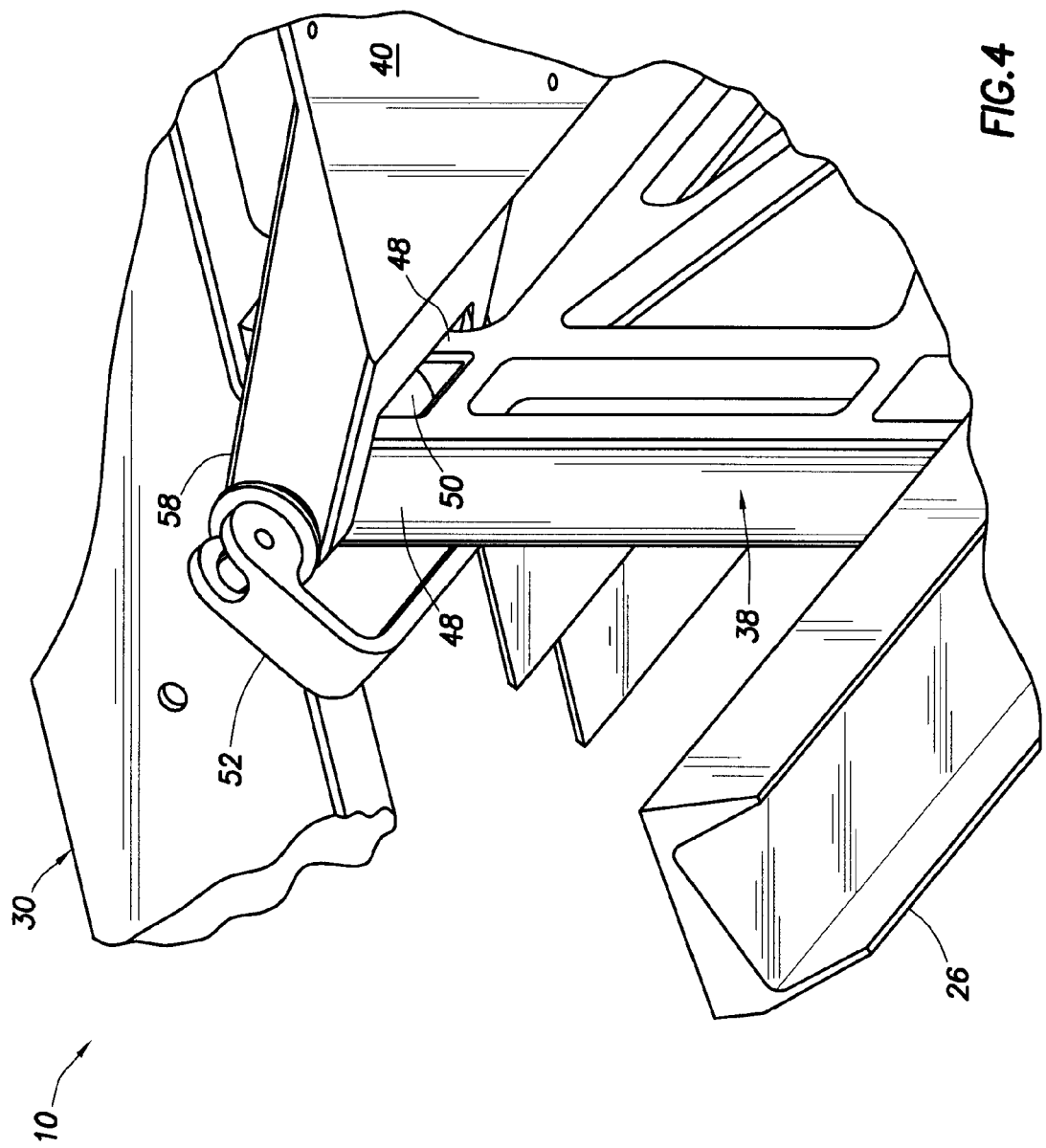
FIG. 4 is an enlarged scale perspective detail view through the ordnance mounting system taken generally along line 3-3 of FIG. 1.

Turning now to FIGS. 1, 3 and 4, this anchoring is representatively achieved by means of (1) two pairs of lugs 58 on the left end of the shear plate 40, between which the lugs 48 and 50 extend and are pinned thereto by the upper expansion pins 52, and (2) the anchoring, as at area 60 in FIG. 1, of a right end portion of the shear plate 40 to the top side 28 of the fuel cell 18 (or another interior portion of the helicopter 12 as the case may be).

As previously mentioned herein, this anchoring of the shear plate 40 to the left strut, the left end of the support beam 30, and the fuel cell 18, prevents longitudinal translational movement of the support beam 30 relative to the helicopter 12, and also prevents pivoting of the left strut 38 relative to the underlying sill 26 to which it is secured. However, it permits the support beam 30 to pivot relative to the upper end of the left strut 38.

There is no similar intersecurement of the fuel cell 18, a right end portion of the support beam 30, and the right strut 38. This desirably permits a limited amount of upward and downward bending flexure of a central longitudinal section of the installed support beam 30 (due to flight and weaponry weight loads on the outer ends of the support beam 30) due to the availability of slight pivotal movement, about the axes 54 and 56, among a right end portion of the support beam 30 (as viewed in FIG. 1) and the underlying sill 26 and strut 38 in addition to the slight relative pivotal movement availability between the left end of the support beam 30 and its underlying left strut 38.

While the shear plate 40 has been representatively illustrated and described herein as being secured to the left strut 38 (as viewed in FIG. 1) and the left end of the support beam, it will be readily appreciated by those of skill in this particular art that it could alternatively be secured to the right strut 38, and the right end of the support beam 30, without departing from principles of the present invention.

In the above-described manner the support beam 30 may be operatively extended through the cabin area 14 and secured to the helicopter (or other type of aircraft as the case may be) without the necessity of modifying the cabin area 14 such as, for example modifying or relocating the fuel cell 18. As previously mentioned herein, other configurations and arrangements of the beam mounting system and associated motion limiting structure described in conjunction with FIGS. 1-4 may be utilized, if desired, without departing from principles of the present invention. Two representative examples of these alternative configurations and arrangements are illustrated in FIGS. 5 and 6.

Figure 5:
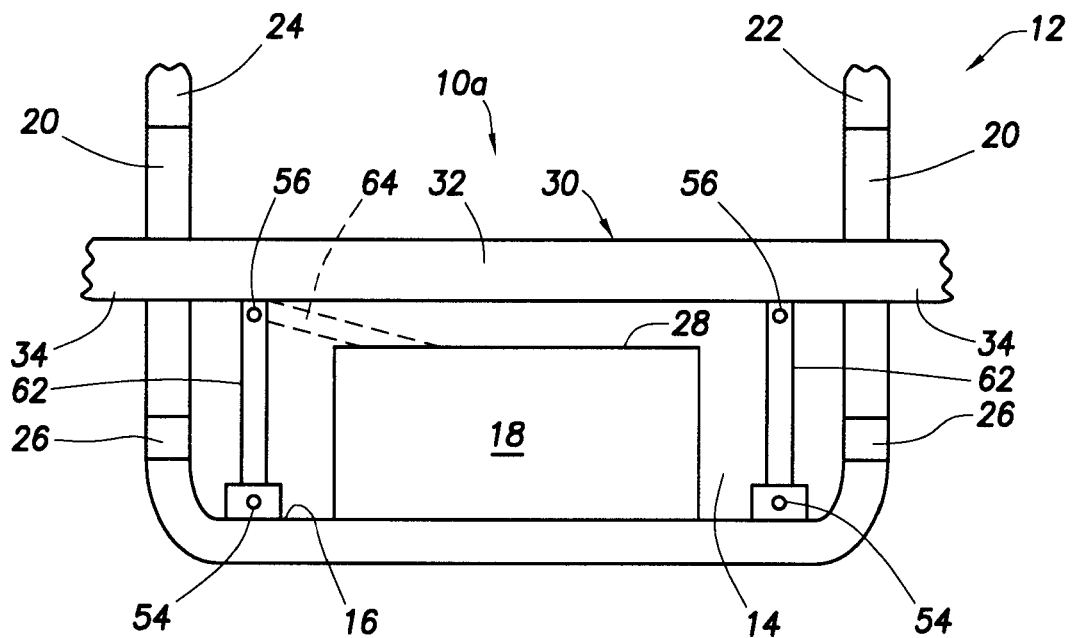
FIGS. 5 and 6 are schematic cross-sectional views through the cabin area of the helicopter and illustrate representative alternate configuration and arrangements of beam mounting system and motion limiting structure portions of the overall ordnance mounting system.

Schematically depicted in FIG. 5 is a first representative alternate embodiment 10a of the previously described ordnance mounting system 10. In the ordnance mounting system 10a its beam mounting system portion comprises (as viewed in FIG. 5) left and right vertical support structures 62 (functioning as the aforementioned first and second support apparatuses) which are disposed on opposite sides of the fuel cell 18 (or other upwardly projecting floor obstruction) and are secured at their lower ends to the cabin floor 54 in a manner permitting them to pivot about axes 54 (in a manner similar to the previously described sill struts), and are secured at their upper ends to the outer end portions 34 of the support beam 30 in a manner permitting the support beam 30 to pivot relative thereto about axes 56. A suitable motion limiting portion 64 may be provided and is anchored to the left support structure 62, the left end portion of the support beam 30 and the fuel cell 18 in a manner preventing longitudinal movement of the support beam 30 relative to the helicopter 12, and preventing pivoting of the left support structure 62 about the left axis 54, but permitting the support beam 30 to pivot about the left axis 56. There is no similar intersecurement of the fuel cell 18, a right end portion of the support beam 30, and the right support structure 62. Accordingly, this desirably permits a limited amount of upward and downward bending flexure of a central longitudinal section of the installed support beam 30 as previously described in conjunction with the ordnance mounting system 10.

With continuing reference to FIG. 5, as an alternative, the motion limiting portion 64 may be eliminated, and the lower end of the left support structure 62 fixedly anchored to the floor 16, to prevent longitudinal translational movement of the beam member 30 relative to the aircraft in a different manner.

Figure 6:
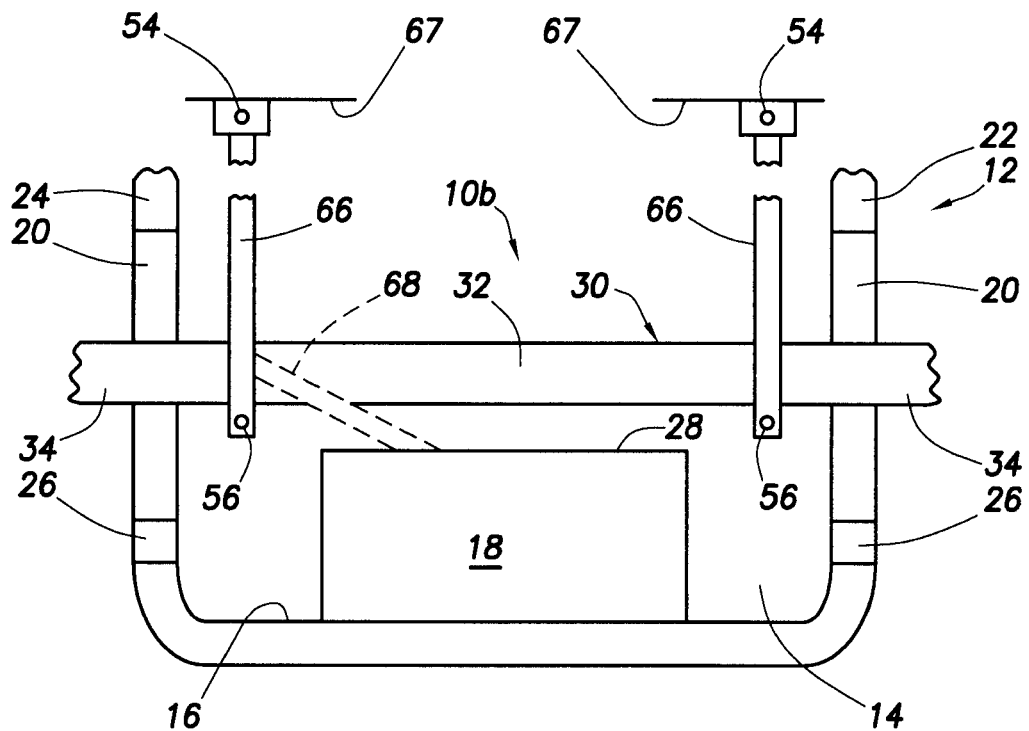

Schematically depicted in FIG. 6 is a second representative alternate embodiment 10b of the previously described ordinance ordnance mounting system 10. In the ordnance mounting system 10b its beam mounting system portion comprises (as viewed in FIG. 6) left and right vertical support structures 66 which are disposed on opposite sides of the fuel cell 18 (or other upwardly projecting floor obstruction) and are secured at their lower ends to the support beam 30 in a manner permitting the support beam 30 to pivot relative thereto about axes 56, and are secured at their upper ends to the cabin ceiling 67 (or alternatively to the fuselage side walls 22,24) in a manner permitting the support structures 66 to pivot relative thereto about axes 54. A suitable motion limiting structure 68 may provided and is anchored to the left support structure 66, a left end portion of the support beam 30 and the fuel cell 18 in a manner preventing longitudinal movement of the support beam 30 relative to the helicopter 12, and preventing pivoting of the left support structure 66 about the left axis 54, but permitting the support beam 30 to pivot about the left axis 56. There is no similar intersecurement of the fuel cell 18, a right end portion of the support beam 30, and the right support structure 66. Accordingly, this desirably permits a limited amount of upward and downward bending flexure of a central longitudinal section of the installed support beam 30 as previously described in conjunction with the ordnance mounting system 10.

With continuing reference to FIG. 6, as an alternative, the motion limiting portion 68 may be eliminated, and the upper end of the left support structure 66 fixedly anchored to the 68 (or the side wall 24 as the case may be), to prevent longitudinal translational movement of the beam member 30 relative to the aircraft in a different manner.

With respect to the illustrative alternate ordnance mounting system embodiments 10a and 10b it will be readily appreciated by those of skill in this particular art that the various interconnections between the support beam 30, the support structures and the motion limiting portion of the left support apparatus (if utilized) may be similar to those representatively illustrated and described in conjunction with the or ordnance mounting system 10, or may be other suitable types of interconnections.

The foregoing detailed description is to be clearly understood as being given by way of illustration and example only, the spirit and scope of the present invention being limited solely by the appended claims.

What is claimed is:

1. A method of arming an aircraft having a cabin area with a floor area positioned between a pair of opposite, generally vertical outer aircraft body side wall portions having door openings extending therethrough, and an obstruction extending upwardly from said floor area between said door openings, said method comprising the steps of:

providing an elongated weaponry support beam member having a central longitudinal section disposed between first and second end portions; and supporting said beam member in a manner such that it longitudinally extends transversely through said cabin area with said central longitudinal section disposed above said obstruction and said first and second end portions extending outwardly through said door openings, said supporting step including the steps of:

interconnecting first support apparatus between said first end portion and said aircraft, said first support apparatus permitting pivotal movement of said support beam at and relative to said first support apparatus about a first axis parallel to the length of said aircraft, and precluding longitudinal translational movement of said beam member relative to said aircraft, and interconnecting second support apparatus between said second end portion and said aircraft, said second support apparatus permitting pivotal movement of said support beam at and relative to said second support apparatus about a second axis parallel to the length of said aircraft, said second support apparatus further being pivotable relative to said aircraft about a third axis parallel to the length of said aircraft.

2. The method of claim 1 wherein:

said first support apparatus has a motion limiting portion, and said step of interconnecting first support apparatus includes the step of connecting said motion limiting portion to said obstruction in a manner precluding longitudinal translational movement of said beam member relative to said aircraft.

3. The method of claim 2 wherein:

said motion limiting portion is a generally plate-shaped structure.

4. The method of claim 1 wherein:

each of said door openings has a sill portion, and said steps of interconnecting first support apparatus and interconnecting second support apparatus are performed using first and second strut structures having upper portions respectively and pivotally secured to said first and second end portions, and lower portions secured to said sill portions.

5. The method of claim 1 wherein:

said obstruction is a fuel cell.

6. The method of claim 1 wherein:

said interconnecting steps are performed in a manner such that each of said first and second support apparatus is secured to an interior portion of said cabin area.

7. The method of claim 6 wherein:
said interior portion of said cabin area is selected from the group consisting of said floor area, an interior side wall portion of said cabin area, and a ceiling portion of said cabin area.

8. The method of claim 1 wherein:
said aircraft is a helicopter.

9. The method of claim 1 wherein:
each of said first and second end portions of said beam member has weaponry support structure thereon.

10. Armament apparatus for an aircraft having a cabin area with a floor area positioned between a pair of opposite, generally vertical outer aircraft body side wall portions having door openings extending therethrough, and an obstruction extending upwardly from said floor area between said door openings, said armament apparatus comprising:
   an elongated weaponry support beam member having a central longitudinal section disposed between first and second end portions, said central longitudinal section being disposed above said obstruction, and said first and second end portions extending outwardly through said door openings;
   first support apparatus interconnected between said first end portion and said aircraft, said first support apparatus permitting pivotal movement of said support beam at and relative to said first support apparatus about a first axis parallel to the length of said aircraft, and precluding longitudinal translational movement of said beam member relative to said aircraft; and
   second support apparatus interconnected between said second end portion and said aircraft, said second support apparatus permitting pivotal movement of said support beam at and relative to said second support apparatus about a second axis parallel to the length of said aircraft, said second support apparatus further being pivotable relative to said aircraft about a third axis parallel to the length of said aircraft.

11. The armament apparatus of claim 10 wherein:
said first support apparatus has a motion limiting portion connected to said obstruction in a manner precluding longitudinal translational movement of said beam member relative to said aircraft.

12. The armament apparatus of claim 10 wherein:
each of said door openings has a sill portion, and
said first support apparatus and said second support apparatus respectively include first and second strut structures having upper portions respectively and pivotally secured to said first and second end portions, and lower portions secured to said sill portions.

13. The armament apparatus of claim 10 wherein:
said obstruction is a fuel cell.

14. The armament apparatus of claim 10 wherein:
each of said first and second support apparatus is secured to an interior portion of said cabin area.

15. The armament apparatus of claim 14 wherein:
said interior portion of said cabin area is selected from the group consisting of said floor area, an interior side wall portion of said cabin area, and a ceiling portion of said cabin area.

16. The armament apparatus of claim 10 wherein:
said aircraft is a helicopter.

17. The armament apparatus of claim 10 wherein:
each of said first and second end portions of said beam member has weaponry support structure thereon.

* * * * *